United States Patent Office 2,994,111
Patented Aug. 1, 1961

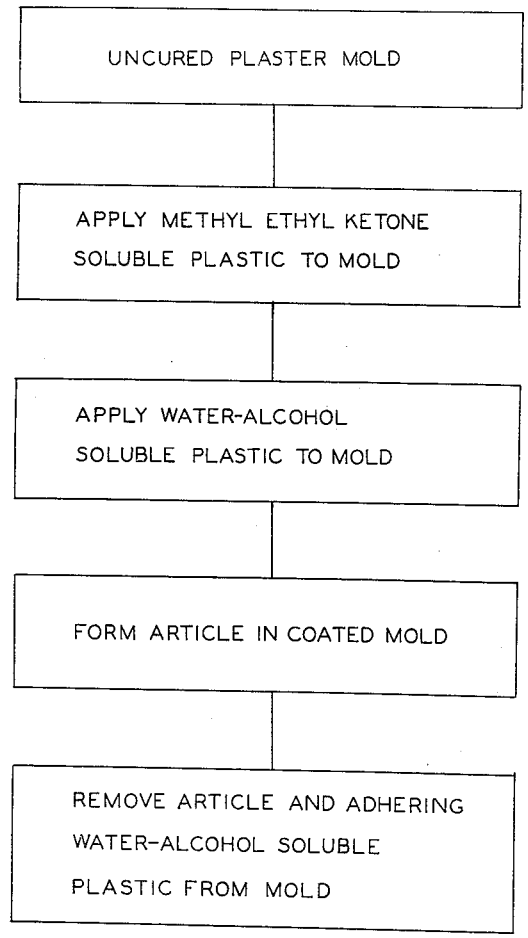

2,994,111
METHOD OF MAKING METALLIZED PLASTIC PARTS
Stephen G. Koss, Warren, and George A. Tanguay, Mount Clemens, Mich., assignors to General Motors Corporation, Detroit, Mich., a corporation of Delaware
Filed Sept. 19, 1957, Ser. No. 684,868
2 Claims. (Cl. 18—59)

This invention relates to the manufacture of metallized plastic parts. Specifically, this invention relates to the method for making metallized plastic parts which are readily separable from the plaster molds on which they are formed.

Metallized plastic parts are useful in the manufacture of proto-types for engineering developments as well as in the production of display articles. In one method for making metallized plastic parts, a plaster mold is made of the part and a thin metallic film is sprayed thereover by means of a conventional metallizing spray gun, such as known in the art. The metallic film conforms to the contours of the mold and assumes the particular configurations and impressions thereof. A plastic material is subsequently applied to the metallic coating while it is still on the mold to serve as a backing material for the metal film when it is removed from the mold. The plastic adheres to the metal coating and, upon removal of the composite article from the mold, the plastic serves to give supporting strength to the metal film. In some instances, a webbing or woven material such as Fiberglas or the like, is included in the plastic layer to increase the rigidity and strength of the plastic backing. The webbing or woven material can be laminated in several layers over the metallic coating with intervening layers of plastic.

The economical manufacture of metallized plastic parts by this method has heretofore been impeded due to difficulty in separating the parts from the plaster molds. It is desired that the metallic coating adhere to the mold with sufficient tenacity that the surface characteristics of the mold might be sharply described in the metallic film. Such desirable adherence, however, subsequently impedes removal of the metallized plastic part from the mold. Heretofore, there was not only a large time loss in freeing the metallized plastic part from the mold in the attempt to avoid damage to either, but it was often necessary to destroy the mold in order to free the metallized plastic part. Consequently, it was frequently necessary to make a new plaster mold for each duplicate part manufactured.

It is an object of this invention to provide a method for the manufacture of metallized plastic parts which eliminates the hereinbefore-described disadvantages in the manufacture of such parts.

Another object of the present invention is to provide a method for making metallized plastic parts which does not require the destruction of the mold. Still a further object of the present invention is to provide a method for making metallized plastic parts which are readily separable from plaster molds on which they are formed in order that the molds can be reused.

Briefly, this invention comprises manufacturing a metallized plastic part by forming same on a suitable plaster mold. A plaster mold is coated with two layers of plastic compositions incompatible before the metallized plastic part is formed thereon. The first plastic coating is adherent to the plaster mold while the second plastic coating is adhered to the metallized plastic part. The second plastic coating being incompatible with the first can be readily separated therefrom to free the part from the mold.

Other objects, features and advantages of the present invention will become more apparent from the following description of a preferred embodiment thereof and from the drawing.

In accordance with the invention, a plaster mold which is to be used in the manufacture of a metallized plaster part is made from a master model of the part. As conventionally practiced in such plaster mold making, an accurate finished model of the part is first coated with a mold-releasing agent, such as wax, and then the plaster applied thereover. When the plaster has solidified or "set," it can readily be removed from the model. Upon separation of the plaster mold from the model, the plaster model is ordinarily trim flashed, and all pin holes in its cavity-defining surface are filled in order to provide these surfaces with greater smoothness. Any damage to the mold which may result from the separation thereof from the model is also repaired. The plaster mold is then sprayed with a strippable plastic coating and the plaster mold is subsequently sprayed with a second strippable plastic coating which is incompatible with the first. A thin film or coating of a metal is then sprayed onto the plastic-coated surface of the mold in a manner such as conventionally practiced in the art of making metallized plastic parts. A plastic material is thereafter applied to the metallic film on the mold. This plastic adheres to the metallic film and thereby forms a rigid supporting or backing layer when the metallic film is removed from the mold.

Due to the presence of the two non-compatible plastic layers adjacent the mold surface under the metallized plastic part, this part can readily be withdrawn from the mold. The first layer of plastic coating adheres to the mold and seals the pores thereof while the second layer adheres to the metallic film and is removed therewith. These two underlying coatings adhere to one another sufficiently to permit sharp definition of all details of mold contour in the metallized part yet can readily be separated when removing the part from the mold. The second plastic layer, together with the metallized plastic part, is withdrawn from the mold and this layer is thereafter removed from the metallic surface by washing with a suitable solvent.

The respective thicknesses of the two plastic coatings underlying the metallic film on the mold are not particularly critical and may vary substantially dependent upon the intricacy of the part to be molded. A sufficient thickness is desired to completely seal the plastic from the metal yet permit adequate definition of mold features in the part. Generally, a thickness of 0.002 to 0.004 inch has proved to be satisfactory.

Particularly successful results have been obtained in the manufacture of metallized plastic parts by spraying the surface of an uncured plaster mold with a strippable vinyl plastic, an example of which is Delco X–1000, commercially available from Delco Chemicals, Inc., of Los Angeles, California. This plastic is composed of a combination of vinyl resins such as polyvinyl chloride and polyvinyl acetate copolymers which are solvated with methyl ethyl ketone, methyl isobutyl ketone and xylene.

The second strippable plastic coating is employed to adhere primarily to the metal coating yet have sufficient adhesion to the first plastic coating so as to retain the second coating against the inner surface of the mold. The second plastic coating which is employed, however, is incompatible with the first and, therefore, can be readily separated therefrom. A strippable vinyl coating which has been employed satisfactorily as the second plastic coating in combination with Delco X–1000 vinyl resin, is Vibrin VPA, also termed "Kotol," and is produced and sold by Naugatuck Chemical, Naugatuck, Connecticut. Vibrin VPA is a solution of polyvinyl alcohol copolymer, dissolved in a water-alcohol solvent system containing a stabilizer and wetting agent.

The metal coating is sprayed over the Vibrin VPA and a plastic backing material subsequently applied thereover. Conventionally, the plastic backing material which is employed, such as a catalyzed epoxy resin, cures readily in air and, after a short time, has sufficient rigidity to support the metal film upon its removal from the mold. As hereinbefore mentioned, the backing material for the metallic film can be additionally strengthened if it is laminated. The backing material can, for example, be a lamination of an epoxy resin and a fibrous webbed material or the like. It has been the practice in the art to laminate glass fibers in this manner to give especially strong and rigid support.

The plastic, Vibrin VPA, adhering to the surface of the metallized plastic part after it has been removed from the mold, is soluble in a water-alcohol solvent and can be readily washed from the surface of the metallic film. Thus, washing the surface of the metallized plastic part with a water-alcohol mixture removes the film and exposes the metallic surface for any further necessary treatment such as buffing, electroplating with chromium, etc.

Although the method of the present invention can be most advantageously practiced with the above-described combination of Delco X–1000 and Vibrin VPA, it can also be practiced employing the methyl ethyl ketone soluble plastics, polyvinyl chloride, polyvinyl acetate, or mixtures thereof in place of the Delco X–1000. Any of the above substances can be used in the initial plastic layer immediately adjacent the inner surface of the mold. These substances can be employed in combination with the Kotol or with water-alcohol soluble plastics such as cellulose, cellulose acetate, polyvinyl alcohol and water-alcohol soluble copolymers of polyvinyl alcohol.

Although this invention has been described with certain specific examples thereof, no limitation is intended thereby except as defined by the appended claims.

We claim:

1. The method of molding articles which comprises applying to the surface of an uncured plaster mold a first coating of methyl ethyl ketone soluble plastic selected from the group consisting of polyvinyl chloride, polyvinyl acetate and mixtures of polyvinyl chloride and polyvinyl acetate, applying to said first coating a second coating of a water-alcohol soluble plastic selected from the group consisting of cellulose, cellulose acetate, polyvinyl alcohol and copolymers of polyvinyl alcohol, forming an article in said coated mold and, thereafter, removing said formed article and said second coating as a composite unit from said mold.

2. The method of molding articles which comprises applying to the surface of an uncured plaster mold a first coating of methyl ethyl ketone soluble plastic selected from the group consisting of polyvinyl chloride, polyvinyl acetate and mixtures of polyvinyl chloride and polyvinyl acetate, applying to said first coating a second coating of a water-alcohol soluble plastic selected from the group consisting of cellulose, cellulose acetate, polyvinyl alcohol and copolymers of polyvinyl alcohol, metal spraying a metal coating onto said second layer, applying a plastic backing material to said metal coating while it is still on the mold and, thereafter, removing from said mold the second layer, the metal coating and the backing as a composite unit.

References Cited in the file of this patent

UNITED STATES PATENTS

| | | |
|---|---|---|
| 306,468 | Daly | Oct. 14, 1884 |
| 2,376,244 | Freeman | May 15, 1945 |
| 2,454,910 | Carr | Nov. 30, 1948 |
| 2,613,397 | Borkland | Oct. 14, 1952 |